United States Patent [19]

Moore et al.

[11] 4,209,902
[45] Jul. 1, 1980

[54] APPARATUS FOR CUTTING VEGETATION

[75] Inventors: James L. Moore; Lenoard G. Ewing, both of Houston, Tex.

[73] Assignee: Emerson Electric Co., St. Louis, Mo.

[21] Appl. No.: 861,788

[22] Filed: Dec. 19, 1977

[51] Int. Cl.² .................. A01D 35/26; A01G 3/06
[52] U.S. Cl. .................................. 30/276; 56/12.7
[58] Field of Search ............... 30/276, 347; 56/12.7, 56/295

[56] References Cited

U.S. PATENT DOCUMENTS

| | | | |
|---|---|---|---|
| 3,708,967 | 1/1973 | Geist et al. | 56/12.7 |
| 3,928,911 | 12/1975 | Pittinger | 30/276 |
| 4,077,191 | 3/1978 | Pittinger et al. | 30/276 |
| 4,091,536 | 5/1978 | Bartholomew | 30/276 |
| 4,134,204 | 1/1979 | Perdue | 30/276 |

FOREIGN PATENT DOCUMENTS 1281450 12/1961 France ........................ 30/276

Primary Examiner—Jimmy C. Peters
Attorney, Agent, or Firm—Emil J. Bednar

[57] ABSTRACT

An improved apparatus for cutting vegetation which is especially adapted to be employed with units having a top mounted gasoline motor interconnected by a drive tube to a lower rotating cutting head. An accessory handle is carried adjacent the motor. A housing carried on the lowermost drive tube encloses bearings and provides a journal for the cutting head. An actuator housing bolts to the housing and interfits for rigid support. A mechanical line feeder on the cutting head is operated by an actuating lever carried on the accessory handle through an interconnecting control cable. Reciprocation of the control lever operates the mechanical line feeder so that a predetermined length of cutting line is extended from the cutting head during rotation without interrupting cutting.

4 Claims, 8 Drawing Figures

APPARATUS FOR CUTTING VEGETATION

BACKGROUND OF THE INVENTION

1. Field of the Invention

This invention relates to the cutting of vegetation, and more particularly, it relates to the cutting of vegetation using a flexible non-metallic line extending from a rotating head into a cutting plane.

2. Description of the Prior Art

Various types of devices have been proposed for many years to facilitate the removal of vegetation by mowing, trimming, edging and like cutting operations. In general, these devices have employed a metal blade to effect vegetation removal. Devices of this nature employ powerful prime movers such as electric and gasoline motors. As a result, serious and terrible injury could be inflicted upon the user where unintended contact occurred with rotating metal blades.

In about 1960, there was developed in Europe a trimmer or edger unit employing a flexible polymeric line extending from a rotating head for cutting vegetation. This unit did not work properly because of several defects in structure and operating parameters. In the United States of America, practical cutting devices, using flexible non-metallic lines carried upon a rotating head were developed. These devices are shown in U.S. Pat. Nos. 3,708,967, 3,828,068, 3,859,776, 4,035,912, 4,052,789 and 4,054,992. These patented devices have met outstanding success in that these American developments are probably the safest power operated tools yet invented for vegetation cutting, edging and trimming operations. In particular the gasoline powered devices employing the invention of these patents have found outstanding use for such heavy vegetation removal as in the right aways for roads and power lines, cemetery cleaning and like vegetation cutting operations wherein the growth can become excessive. In particular, the gasoline powered devices are employed to good effect in both commercial and private vegetation cutting operations. These devices generally carry topside a gasoline motor at one end of a drive tube which extended downwardly to a lower rotating head which carries one or more Nylon ® polymer cutting lines. Rotation of the cutting head extends the cutting line radially outwardly into a cutting plane wherein the vegetation is cut. One or more accessory handles placed adjacent the motor facilitate the operator in controlling vegetation cutting. At the lower end of the drive tube, a housing is mounted and provides a bearing upon which the rotating cutting head is journaled. The housing carries (1) a circular bearing skirt which extends axially towards the cutting head, (2) a superimposed shoulder, and (3) surfaces upon which a guard or shield is secured by bolts.

Although the cutting lines carried upon the cutting head may comprise one or more Nylon ® polymeric members having diameters between 0.065 and 0.100 inches, heavy vegetative cutting operations with time cause the lines to be frayed, broken, and otherwise shortened. When desired to replenish the cutting line from the conventional cutting head, cutting operation of the unit had to be stopped. Then, additional line was extended manually from the head. For example, the cutting line might be carried upon a spool internally of the cutting head. The spool was released for rotation and additional line length pulled from the head into the cutting plane. Then, the spool was again secured against rotation in the head. In the more powerful vegetating cutting apparatus powered by gasoline motors, the time expended in stopping the unit and extending additional line is a waste and reduces the cutting efficiency of these units. It is desirable that the operator continue cutting operations with the ability to extend cutting line from the rotating head in desired lengths and under his complete control.

The present invention is an apparatus for cutting vegetation, in the nature of the patented devices, but uses a simple assembly to provide operator controlled cutting line extensions. The assembly is readily combined with the various power driven vegetating cutting apparatus and without any substantially rebuilding or altering of their original structures, The present invention provides a mechanical line feeding mechanism so that the operator may extend the cutting line in deserete incremental lengths from the cutting head as he desires during cutting operations. Other features of the present invention will be apparent from the following description.

SUMMARY OF THE INVENTION

In accordance with this invention, there is provided an apparatus for cutting vegetation which has a prime mover, a rotatable cutting head, a drive tube interconnecting the prime mover with the rotatable cutting head using an enclosed power transmitting cable. An accessory handle is carried on the drive tube adjacent the prime mover. The cutting head is adapted for feeding cutting line upon receipt of a mechanical signal from a control lever carried upon the unit, preferably upon the accessory handle. The cutting head carries a mechanical line feeder which feeds, upon receipt of the mechanical signal, a predetermined length of cutting line from the rotating cutting head outwardly into the cutting plane. An actuator lever is pivotedly mounted within an actuator housing which is secured by bolts to a lower housing carried upon the drive tube adjacent the cutting head. This lower housing has a lower circular bearing skirt and a superimposed planar shoulder to which transverse guard supports may be bolted. The actuator housing also carries upstanding ears adapted to be secured by the bolts to this lower housing. The actuator housing has a central opening received about the circular bearing skirt with an upper abutment surface engaging the planar shoulder of the lower housing to provide an integral interconnection between these housings. Within the actuator housing, the actuator lever has a fulcrum for applying the mechanical signal from the control lever to the mechanical line feeder through the control cable.

DESCRIPTION OF SPECIFIC EMBODIMENTS

Figure 1:
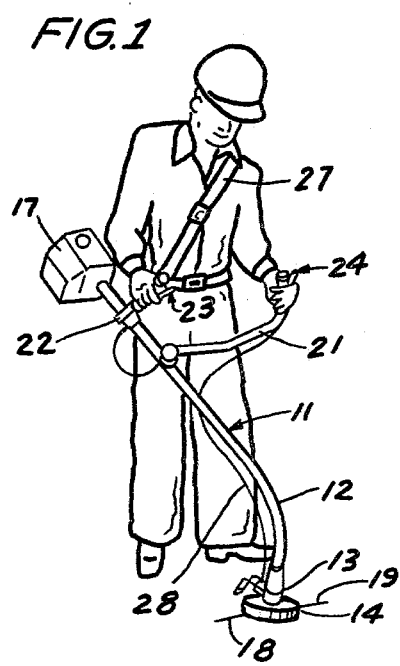
FIG. 1 is an elevational view illustrating an operator using one embodiment of apparatus for cutting vegetation which apparatus is arranged according to the present invention.

Referring to FIG. 1, there is shown an apparatus for cutting vegetation which comprises a gasoline powered unit of the prior art in combination with the elements forming one preferred embodiment of the present invention. The apparatus 11 shown in FIG. 1 may be of any form such as the commercially available Weedy ® Model 657 trimmer/edger manufactured and sold by Weed Eater, Inc. The apparatus 11 has a drive tube or tubular extension 12 which extends from a top mounted gasoline motor 17 to a lower bearing housing 13. A cutting head 14 is journaled within the bearing housing 13 and is rotated by the gasoline motor through a drive shaft or cable 16 (shown in FIG. 3). Rotation of the cutting head serves to extend one or more cutting lines 18 and 19 into a cutting plane of removal of vegetation. The operator grasp left and right accessory handles 21 and 22, respectively mounted on the tube 12. A gas control lever 23 mounted upon the right accessory handle 22 is used to regulate the speed of the motor 17 which determines the angular velocity with which the cutting head 14 is rotated. Although the head 14 may carry only one cutting line 18, several lines are usually employed with the gasoline powered apparatus 11 in heavy vegetation cutting operations. An accessory strap 27 may be used by the operator to support the apparatus 11 during extended periods of use. The strap 27 is swivel mounted upon drive tube 12 at the center of gravity position adjacent the motor 17.

Preferable, the cutting head 14 carries a plurality of cutting lines disposed in equal angular spacings for dynamic balance. The cutting lines can be extruded from monofilament polymeric material such as Nylon ® polymer. Good results are obtained with the cutting lines being a non-metallic filament with a diameter of between 0.065 and 0.100 inches. However, the cutting lines may have diameters of somewhat lesser or greater dimensions that the stated range and yet perform in an acceptable fashion. Rotation of the cutting head causes the cutting lines to be extended substantially radially several inches, e.g., 5–10 inches into the cutting plane. The tip velocity of the cutting lines should be at least 14,000 feet per minute for effective vegetation cutting. Generally, the cutting line should not exceed tip velocities above about 30,000 feet per minute.

In the present embodiment, a control lever 24 is pivotedly mounted upon the left accessory handle 21. The operator will grasp the lever 24 to extend the cutting lines 18 and 19 from the cutting head 14 without interrupting vegetation cutting. The control lever 24 reciprocated by the operator provides a mechanical signal which is carried by a control cable 26 in sheath 28 along the drive tube 12 to a mechanical line feeder mechanism associated with the cutting head 14.

Figure 8:
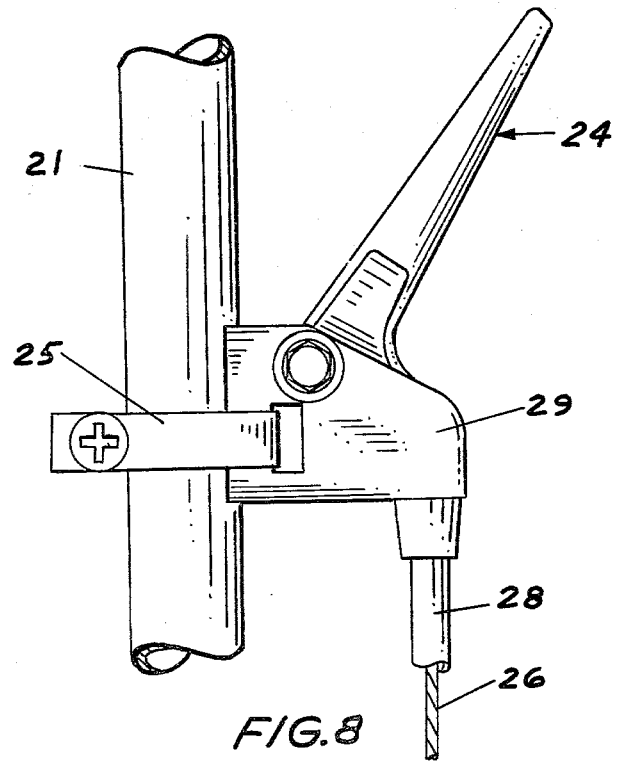
FIG. 8 is a partial elevation illustrating the control lever pivotally mounted on one accessory handle of the apparatus shown in FIG. 1.

Referring to FIG. 8, the control lever 24 is mounted to the accessory handle 21 by a strap clamp 25 which is secured to a frame 29.

Figure 2:
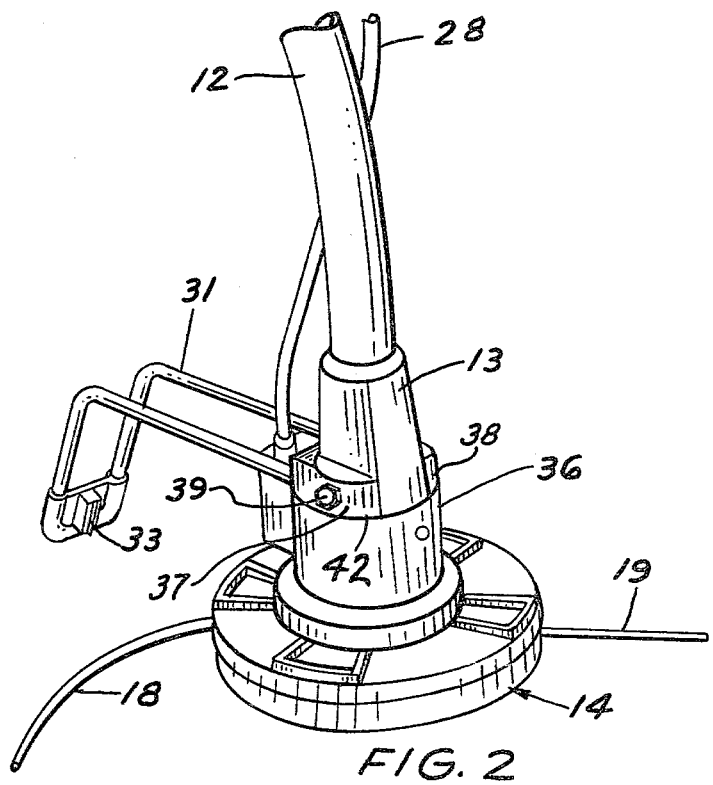
FIG. 2 illustrates in enlargement an elevational view of the lower portion of the apparatus shown in FIG. 1.

Referring now to FIG. 2, the housing 13 is secured by bolting to the lower end of the drive tube 12. The housing 13 may carry a guard 31 for protection of the cutting head 14 when the apparatus 11 is rested upon the ground during periods of non-use. For example the guard 31 may be a single length of steel rod which is bent into a U shape with an intermediate obtuse-angled bend for alignment with a pair of grooves 32 transversly formed within the bearing housing 13. The free ends 34 of the guard 31 (as can be best seen in FIG. 3) usually are secured within the grooves 32 by bolts 39 and 41. The lower U shaped end 35 of the guard 31 carries a blade cutter 33 which serves to-cut-to a predetermined length of the cutting lines 18 and 19 extending from the cutting head 14.

Figure 3:
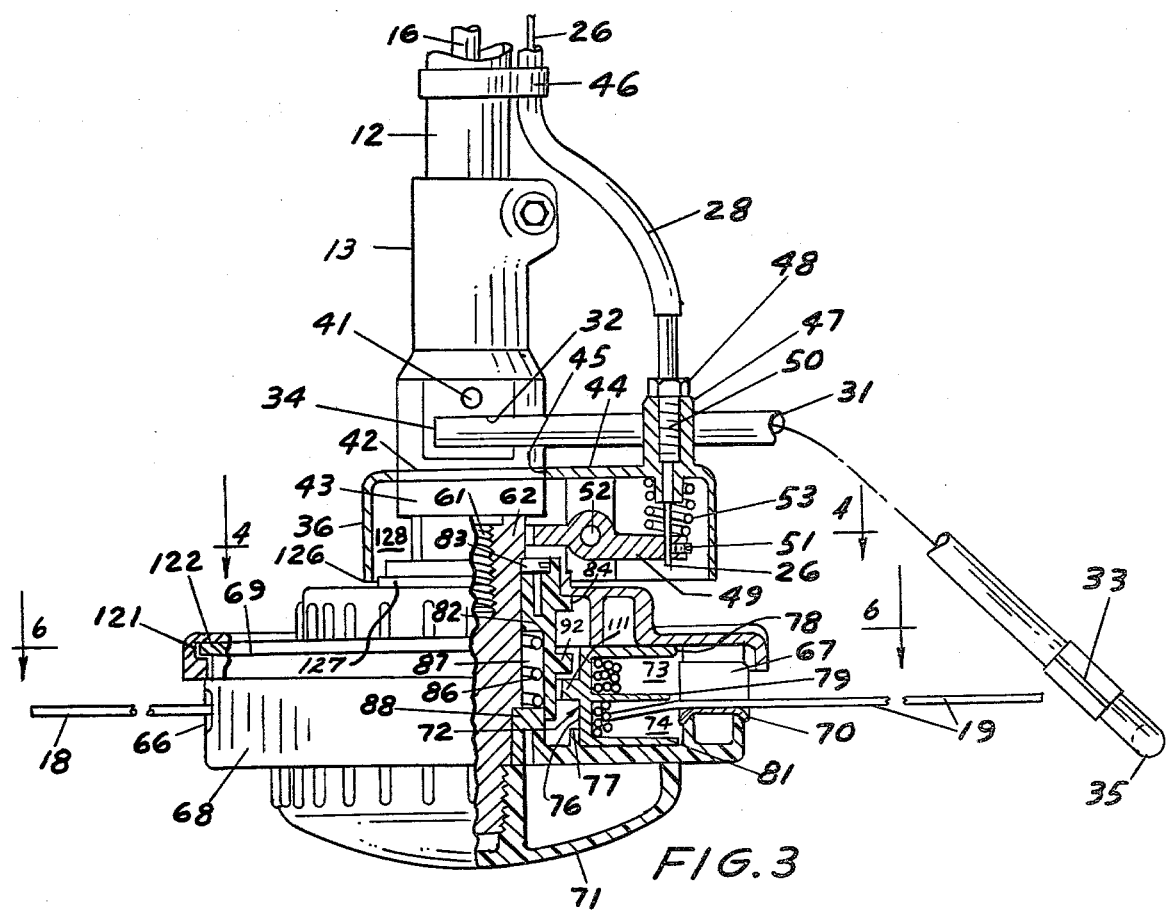
FIG. 3 is a partial vertical section taken through the lower portion of the apparatus shown in FIG. 2.

In reference to FIGS. 2 and 3 the lower end of the sheath 28 terminates at an actuator housing 36 which is integrally carried upon the bearing support 13. For this purpose, the actuator housing 36 carries a pair of upstanding ears 37 and 38 which are connected to the housing 13 by bolts 39 and 41, respectively. The bearing housing 13 has a circular bearing skirt 43 and a superimposed planar shoulder 42. The shoulder and skirt engage tightly with complementary surfaces 44 and 45 the actuator housing 36 to provide a firm and integral interconnection with the apparatus 11. The sheath 28 is secured by a spring clamp 46 about the drive tube 12 adjacent the bearing housing 13. The lower end of the sheath 28 is secured in an upstanding tubular projection 47 of the actuator housing 36 by a hollow stud carrying a compression nut 48. The cable 26 extends through stud 50 to the interior of the accessory housing 36 and connects integrally to one end of an actuating lever 49 by a set screw 51. The actuating lever 49 is pivotedly mounted to the accessory housing by a transverse pin 52 which extends between its adjacent side walls. A spring 53 serves to bias the actuating lever 49 into a disengaged position (as shown in the FIGS. 2, 3 and 4). The mechanical signal transmitted by the cable 26 moves the lever 49 upwardly to compress the spring 53. The other end of the lever 49 acts to actuate the line feeder system in the cutting head 14.

Figure 4:
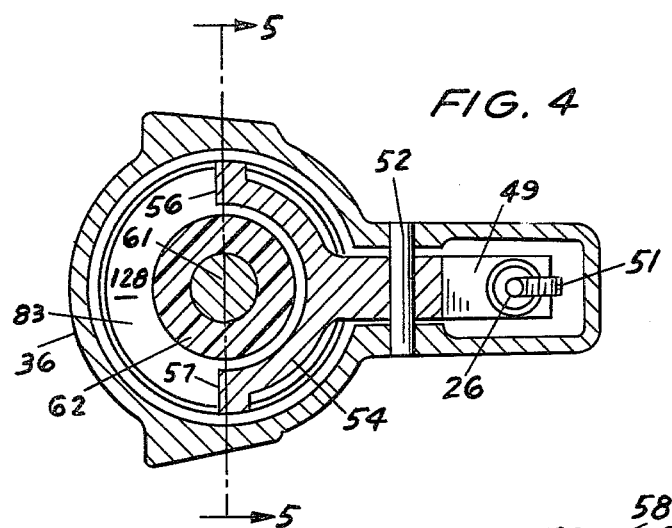
FIG. 4 is a cross section of the apparatus shown in FIG. 3 and taken along line 4—4 therein.
Figure 5:
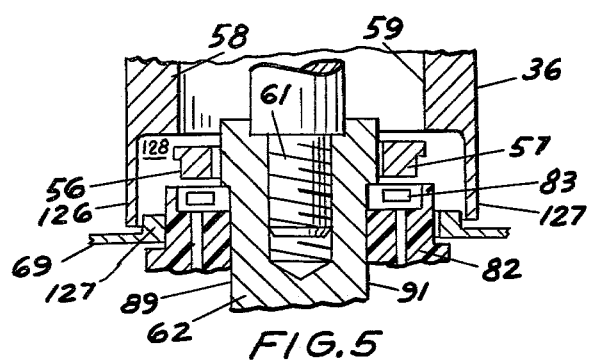
FIG. 5 is a partial axial section taken along line 5—5 of the structure shown in FIG. 4.

Referring to FIGS. 4 and 5, the other end of the actuating lever 49 can be in the form of a forked portion 54 which terminates in bearing pads 56 and 57. The actuator housing 36 carries stop shoulders 58 and 59 which limit the upward travel of the pads 56 and 57 of the lever 49. These shoulders may be formed as a semicyclindrical vertical ridges upon the internal wall of the accessory housing 36.

Returning now to FIGS. 3, 4 and 5, the lower end of the drive cable 16 is connected to a drive stud 61 which extends from the circular bearing skirt 43 on the housing 13. The head 14 connects onto the drive stud 61 by a threaded adapter 62. The forked portion 54 of the lever 49 resides laterally about the adaptor 62 interiorly of actuator housing 36 immediately above the cutting head 14.

The head 14 is provided with a mechanical line feeder system which can receive the mechanical signal through the arm 49 and responsively effect the extension of a certain length of cutting line from the head 14. Any suitable mechanism may be employed for the mechanical line feeder but a preferred embodiment thereof is shown in a FIG. 3. More particularly, the head 14 is disc-like with a smooth peripheral side surface which has apertures 66 and 67 through which cutting lines 18 and 19, respectively, extend outwardly into the cutting plane. The head 14 carries metal curvilinear bearing surface 70 (as described in U.S. Pat. No. 4,035,912) on the leading and trailing edges of the apertures to reduce galling and unintended breaking of the cutting lines in cutting heavy vegetation. The head 14 includes a hub 68 and a spool 72 with a cover 69, and a guide ball 71 holding these parts of the head onto the drive adapter 62. The spool 72 is journaled within the open ended hub 68 and rotates independently of the head 14. For this purpose, the spool may have an annular configuration with an interior cylindrical wall 76 which is journal about a cylindrical rim 77 on the hub 68. The spool 76 has 3 spaced apart radial extending flanges 78, 79 and 81 which serve as bearing elements between the cover 69 and the hub 68. As a result, the spool 72 is as journaled for rotation relative to the axis of rotation of the head 14. These flanges also define two line storage areas 73 and 74 wherein reside coil storage portions of the cutting lines 18 and 19. Preferably, the cutting lines are wound counter-directionally to the direction of rotation of the head 14 to assist in the feed of these cutting lines from the head upon a mechanical signal given by the operator through the use of the control lever 24.

The mechanical line feeding mechanism associated with the cutting head 14 is of any design which controls the rotation of the spool 72 within the head 14 to feed a predetermined length of cutting line from the head into the cutting plane as needed by the operator of the apparatus 11. In the particular embodiment illustrated in the present drawings, the mechanical line feeder mechanism includes a gear element 82 which is axially moved by the lever 49. This gear 82 carries elements forming an escapement with the spool 72 for feeding a predetermined length of the cutting line from the cutting head 14 into the cutting plane. More particularly, the gear 82 is mounted for slidable axial movement upon the adaptor 62. As seen in FIG. 3 is the gear in its released or normal upward position. An antifriction bearing 83 of an annular configuration is held at the upper end of the gear and against the shoulder 84 on the drive adaptor 62. A spring 86 is carried in an annulus 87 formed between the gear 82 and the side exterior surface of the drive adaptor 62. The lower end of the spring 86 is held in place by an upward square-shouldered projection 88 upon the hub 68. As a result of this arrangement, the drive gear 82 (with the lever 49 released) is forced into the upward position and seats with the stop 84 upon the drive adaptor 62 resting against the cover 69. The escapement provided between the gear 82 and the spool 72 is such that when the gear adaptor is in this upward position, the spool 72 is locked against angular displacement relative to the head 14. Stated in another manner, with the gear 82 in the upward position, the spool 72 rotates in unison with the head 14 and no cutting line can be extended from the cutting head. When the lever 49 is actuated its fork portion 54 moves downwardly with the pads 56 and 57 pressing upon the antifriction bearing 83. As a result, the gear 82 is moved axially into its downward or lower position so that the spool 72 is released to rotate a predetermined angular displacement and thereby feed a predetermined length of each cutting line from the head 14.

It is preferred that the pads 56 and 57 press upon the antifriction bearing 82 at diametrically oposite positions so that the only axial force is applied through to the antifriction bearing 83 and the gear 82. As a result, no unbalanced lateral or radial forces are applied to the gear which then moves in a smooth crisp manner.

Figure 6:
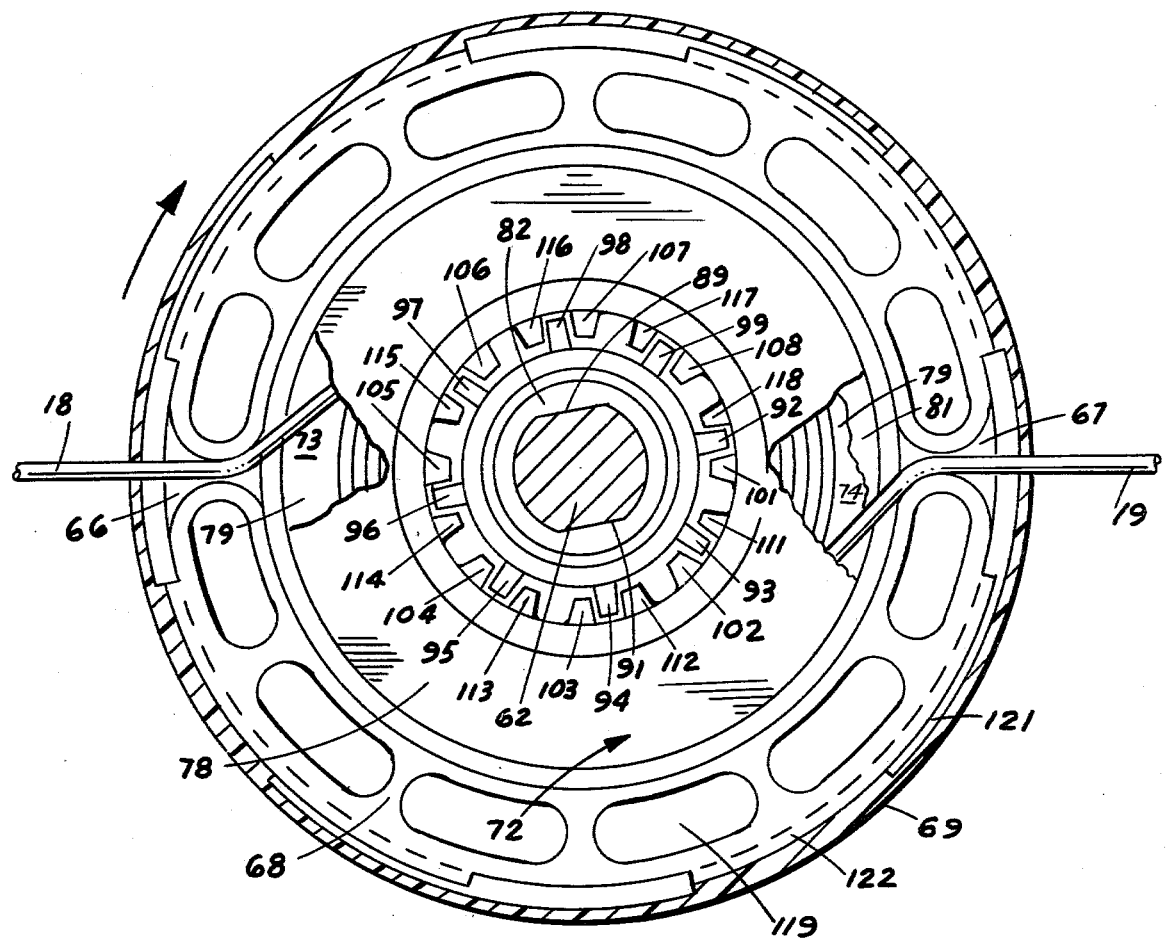
FIG. 6 is an enlarged cross section of FIG. 3 taken along line 6—6 herein showing the interior construction of the cutting head.
Figure 7:
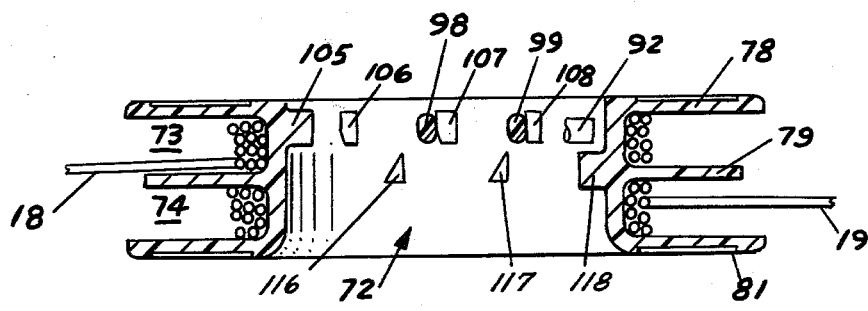
FIG. 7 is a partial vertical section in reduced scale taken centrally through the spool of FIG. 6 and illustrating the spool carrying two coiled portions of cutting line and the teeth forming an escapement to regulate rotation of the spool.

The gear 82, as best seen in FIGS. 6 and 7, has a non circular opening therethrough to engage a non circular cross section portion upon the drive adaptor 62. More particularly, the drive adaptor 62 has a pair of flats 89 and 91 which engage complimentary flat surfaces within the gear 82. As a result, the gear 82 is driven by the drive adaptor 62 but yet may move axially thereupon to carry out the mechanical line feeding function of the head 14.

Preferably, the gear 82 and spool 72 carry an escapement formed by plurality of spaced teeth. More particularly, the gear 82 carries a plurality of circumferentially spaced teeth 92-99 at a horizon adjacent the flange 78 of the spool 72. These teeth engage complimentary teeth 101-108 which are spaced circumferentially about the opening 76 of the spool 72 and at a horizon to engage with the teeth 92-99 of the gear 82. With this arrangement, the spool 72 is locked to the head 18 and rotates therewith when the gear 82 in its upper position as shown in FIGS. 3, 6 and 7.

The spool 72 also carries a second plurality of circumferentially spaced teeth 111-118 within its inner surface but at a different horizon so as to be out of engagement with the teeth 92 to 99 of the gear 82 when it is in its upward position. The teeth 111-118 of the spool 72 are also angularly off-set from the teeth 101-108. As a result, downward movement of the gear 82 (responsive to the mechanical signal applied by the lever 49) releases the teeth on the gear from the teeth 101-108 on a spool while moving to engage the offset teeth 111-118 of the spool 72 after rotating angularly a first part of its predetermined displacement relative to the head 14. Thereupon, the gear 82 returns to its upward position to reengage with the teeth 101-108 when the spool completes the second part of this angular displacement. The spool is again locked to the head 14.

When desired, the operator actuates the control lever 24 to reciprocate the actuator lever 49 and depress the gear 82 to its lower position which then returns to its upper position. Responsivly, the spool 72 is allowed to rotate its predetermined angular displacement in the rotating head. Since the teeth on the gear 82 and spool 72 are uniformly spaced but offset from one another, the number of teeth on the gear and spool determine the actual ultimate angular displacement of the spool 72 relative to the head 14. It is obvious that the number of teeth and spacings can be adjusted so that any predesired rotation of the spool in the head 14 can be obtained which correlates to a certain desired extention of the cutting lines 18 and 19 from the rotating head 14. Since the head 14 is rotating while the operator actuates the control lever 24, centrifucal force is sufficient to allow the lines 18 and 19 to rotate the spool 72 within preset limits as determined by the engagements and disengagements of the respective teeth on the gear 82 and the spool 72. Obviously, the spring 86 returns the gear 82 to its upward position where the gear 82 locks the spool to the head 14 after completion of the cutting line extension operation.

The specific arrangement of the several teeth of the gear 82 and spool 72 may be appreciated by a reference to FIGS. 6 and 7. Portions of the flanges 78 and 79 are broken away to show the cutting line storage areas 73 and 74. Preferably, the cutting lines are wound counter-directionally to the rotation of the head 14 that the spool rotates in a counterdirection to the rotation of the head through the pull of the cutting lines 18 and 19. As a result, the teeth 101-108 of the spool will stop on the teeth teeth 111-118 upon the gear 82 to permit proper angular displacement of the spool 72 relative to the head 14. The wall of the hub 68 may be provided with a plurality of openings 119 which are spaced uniformly about its circumference so as to lighten or reduce the mass of the rotating cutting head 14. The cover 69 can be secured to the hub 68 in any convenient manner. However, good results are provided by the use of grooves 121 and lugs or projections 122 between the cover and hub which interfit in a twist-like connection whereby the cover 69 is releasably secure to the hub 68. The lugs 122 occupy only a small portion of the circumference upon the hub 68 and provide sufficient clearance in the groove 121 whereby the cover 69 is readily removed from the hub. In this manner the glide ball 77 is unscrewed and the hub 68, gear 82, spring 86 and cover 69 are removed. The twist-lock connection is released between these elements and the cover removed. Now, the spool 72 is removed readily from the open ended hub 68 for cutting line replacement or for other reasons.

The positioning of the teeth within the central opening 76 of the spool 72 is shown best in FIG. 7.

Although the teeth upon the gear 82 and spool 72 may be in any configuaration suitable for an escapement, it is preferred that the teeth have shapes to assist in the escapement function and provide a crisp positive angular displacement of the spool relative to the cutting head 14. For this purpose, the upper teeth 101-108 upon the spool 72 preferably are rectilinear in cross section with a slight bevel on the face encountered by the teeth upon the gear 82. The teeth upon the gear 82 are preferably also of a rectilinear configuration but with rounded corners to assist in a smooth release from their engagement with the teeth from the spool. In addition, the middle group of teeth, 111-118 of the spool 72 are preferably formed in quadrilateral or triangular sections. The surfaces of these teeth engaged by the teeth upon the gear 82 are preferably sloped at a slight angle to assist in smooth movement of the gear 82 when returning from its lower to its upper position in response to the action of the spring 86. As a result, the teeth upon the gear 82 smoothly release from both the sets of teeth upon the spool 72.

It will be apparent that the lines 18 and 19 each have as much as 7 pounds of centrifugal force to act upon the spool 72 to induce its rotation. This force is amplified by the diameter of the spool and through mechanical principals it will be seen that the contact between the teeth of the gear 82 and those on the spool 72 can be of substantial magnitudes. For this reason, the sloping surfaces of the teeth of the spool are beneficial to provide a smooth and crisp action of line advancement.

The actuator housing 36 can have a lower skirt 126 which extends downwardly past the horizon at which the anti-friction bearing 83 is carried atop the gear 82. Also, the cover 69 has an upstanding flange 127 which extends upwardly past the lower extrimity of the skirt 126. As a result, the overlapping of these elements prevents grass from entering into the open area 128 in the annulus about the drive adaptor 62 and the interior wall of the skirt 126. Stated in another manner, grass, weeds and other string-like vegetation cannot become wound upon the drive adaptor 62 or other rotating portions of the cutting head 14 enclosed within the skirt 126. This provides for weedless operation and the prevention of any cut vegegation or other debris from interferring with the operation of the actuator lever 49 or the gear 82 during operation of the apparatus 11.

Although the cutting head 14 in all of its elements may be formed of metal, plastic or other material it is preferred to use rather inexpensive polymeric materials which are readily fabricated by high speed molding operations. The spool 72 can carry sufficient amounts of the cutting lines for several years of vegetation cutting befoe requiring a new supply of cutting line. In the event cutting line is required to be replenished, the head 14 is readily removed and disassembled. The operator can either rewind the spool 72 with a fresh supply of cutting line, or alternatively, replace the spool 72 with another spool carrying a fresh supply of the cutting lines. Preferably, the cutting head 14 is constructed entirely of polymeric materials with the exception of the bearing 83, metal bearing surfaces 70 at the apertures 66 and 67, and the spring 86. The antifriction bearing 83 is a pin bearing type. The actuator housing 36 and actuator lever 49 are preferably formed by investment metal casting which has produced good results during extended operation.

From the foregoing, it will be apparent that there has been provided a novel apparatus for cutting vegetation which is enhanced in extended operations by the operator having the ability to extend additional lengths of cutting line as needed without interferring with his cutting operations. Although the novel apparatus has been described with a particular type of vegetative cutting apparatus, it will be apparent that various types of equipment may be employed with the present invention by modest changes in structure and form. It will be understood that certain changes in the present invention may be made without departing from the spirit of this invention. These changes are contemplated by and within the scope of the appended claims which define the invention. Additionally, the present description is intended to be taken as an illustration of this invention.

What is claimed is:

1. In an apparatus for cutting vegetation having a prime mover, a rotatable cutting head, a tubular extension interconnecting the prime mover and a cutting head with an enclosed power transmitting cable, and an accessory handle for supporting the apparatus adjacent the prime mover, the improvement comprising:

(a) a housing mounted on the tubular extension adjacent said cutting head, said housing having a lower circular bearing skirt, a superimposed planar shoulder, transverse guard support means and bolt means:

(b) an actuator housing carrying upstanding ears adapted to be secured by said be bolt means to said housing, said actuator housing having a central opening received about the circular bearing skirt with an upper abutment surface engaging said planar shoulder and said actuator housing carrying internal stop members for limiting upward movement of an actuator lever in response to a biasing member connected at one end of said actuator lever;

(c) mechanical line feeding means carried on said cutting head and adapted to feed upon a mechanical signal a predetermined length of cutting line from said cutting head outwardly into a cutting plane which resides substantially perpendicular to the rotational axis of said cutting head and said mechanical line feeder means including in said cutting head in axially movable gear forming an escapement;

(d) an actuator lever pivoted within said actuator housing and carrying at one end a fulcrum to apply the mechanical signal to said mechanical line feeding means and at the other end a connection to a control cable and said actuator level reciprocating said gear for feeding the predetermined length of said cutting line from the said cutting head into said cutting plane; and (e) a control lever pivotally mounted on the accessory handle and adapted to move said control cable to operate said actuator level.

2. In an apparatus for cutting vegetation having a prime mover, a rotatable cutting head, a tubular extension interconnecting the prime mover and a cutting head with an enclosed power transmitting cable, and an accessory handle for supporting the apparatus adjacent the prime mover, the improvement comprising:

(a) a housing mounted on the tubular extension adjacent said cutting head, said housing having a lower circular bearing skirt, a superimposed planar shoulder, transverse guard support means and bolt means;

(b) an actuator housing carrying upstanding ears adapted to be secured by said bolt means to said housing, said actuator housing having a central opening received about the circular bearing skirt with an upper abutment surface engaging said planar shoulder and said actuator housing having a skirt extending coaxially about a central raised portion of said cutting head whereby vegetation winding is reduced;

(c) mechanical line feeding means carried on said cutting head and adapted to feed upon a mechanical signal a predetermined length of cutting head and adapted to feed upon a mechanical signal a predetermined length of cutting line from said cutting head outwardly into a cutting plane which resides substantially perpendicular to the rotational axis of said cutting head;

(d) an actuator lever pivoted within said actuator housing and carrying at one end a fulcrum to apply the mechanical signal to said mechanical line feeding means and at the other end a connection to a control cable; and (e) a control lever pivotally mounted on the accessory handle and adapted to move said control cable to operate said actuator lever.

3. In an apparatus for cutting vegetation having a prime mover, a rotatable cutting head, a tubular extension interconnecting the prime mover and cutting head with an enclosed power transmitting cable, an accessory handle for supporting the apparatus adjacent the prime mover, said cutting head adapted for feeding cutting line upon receipt of a mechanical signal, a control lever carried upon the accessory handle and connected by a control cable to an actuating lever for applying the mechanical signal to said cutting head, the improvement comprising:

(a) said cutting head including an open-ended hub integrally connected to the power transmitting cable for rotation about an axis;

(b) an axial drive shaft mounted coaxially in said hub;

(c) a spool carrying a supply of cutting line mounted in said hub and spaced about said drive shaft leaving an annulus there between;

(d) a removable cover enclosing said hub at its open end and said cover secured to said hub by a twist-lock interconnection;

(e) said hub, cover and spool having internested cylindrical and planar end bearing surfaces for journaling said spool for rotation in said hub in spaced relationship to said drive shaft;

(f) an axially movable gear mounted upon said drive shaft for axial movement, said gear forming an escapement positioned in the annulus between said gear element and said spool; and (g) an antifriction bearing surface carried at one end of said gear and engageable by said actuator lever whereby said mechanical signal is applied to said gear to move same axially between a first position, whereat said spool is held against rotation relative to said hub and, a second position whereat, said spool is free to rotate a predetermined angular displacement relative to said head whereby a predetermined length of cutting line is extended from said hub into the cutting plane.

4. The apparatus of claim 3 wherein said hub has radial projections and said cover has internal groves adapted to receive said projections forming said twist-lock interconnection.

* * * * *